US005791285A

United States Patent [19]
Johnson

[11] Patent Number: 5,791,285
[45] Date of Patent: Aug. 11, 1998

[54] AUTOMATIC AQUATIC FOOD AND WATER DELIVERY DEVICE

[76] Inventor: Clarence Johnson, 2427 Blaisdell Ave. S., #21, Minneapolis, Minn. 55405

[21] Appl. No.: 824,088

[22] Filed: Mar. 24, 1997

[51] Int. Cl.⁶ ............................................... A01K 61/02
[52] U.S. Cl. ................................................... 119/51.04
[58] Field of Search ............................ 119/51.04, 212, 119/230, 242, 245, 246, 247, 269

[56] References Cited

U.S. PATENT DOCUMENTS

| | | |
|---|---|---|
| D. 287,170 | 12/1986 | Goldman et al. . |
| 597,249 | 1/1898 | Smith ........................................ 119/5 |
| 2,966,885 | 1/1961 | Bentley .................................. 119/51.04 |
| 3,095,852 | 7/1963 | Goldman ..................................... 119/5 |
| 3,140,693 | 7/1964 | Kaunzner . |
| 3,156,214 | 11/1964 | Dennet et al. . |
| 3,177,850 | 4/1965 | Klein . |
| 3,435,804 | 4/1969 | Orlowski . |
| 3,485,373 | 12/1969 | Powers ....................................... 119/5 |
| 3,717,125 | 2/1973 | Sanders . |
| 3,874,340 | 4/1975 | Lemond et al. . |
| 4,059,072 | 11/1977 | Vassallo et al. . |
| 4,130,089 | 12/1978 | Moran . |
| 4,156,401 | 5/1979 | Ogui ......................................... 119/5 |
| 4,237,820 | 12/1980 | Muller .................................. 119/51.04 |
| 4,256,058 | 3/1981 | Deakins . |
| 4,296,710 | 10/1981 | Sillers, III . |
| 4,359,014 | 11/1982 | Molaug et al. ........................ 119/51.04 |
| 4,492,182 | 1/1985 | Wensman et al. ..................... 119/51.04 |
| 4,526,134 | 7/1985 | Sapp . |
| 4,585,112 | 4/1986 | Peeling et al. . |
| 4,593,647 | 6/1986 | Sorgeloos et al. ................... 119/212 X |
| 5,119,764 | 6/1992 | Tum . |
| 5,138,978 | 8/1992 | Reid . |
| 5,140,943 | 8/1992 | Nearhgoff ............................. 119/51.04 |
| 5,174,239 | 12/1992 | Sato ..................................... 119/51.04 |
| 5,282,438 | 2/1994 | McLaughlin ...................... 119/51.04 X |

FOREIGN PATENT DOCUMENTS

| | | | |
|---|---|---|---|
| 2421626 | 11/1975 | Germany ............................ 119/51.04 |
| 309338 | 3/1969 | Sweden ............................... 119/51.04 |
| 925280 | 5/1982 | U.S.S.R. ............................. 119/51.04 |
| 1281007 | 7/1972 | United Kingdom ....................... 119/5 |

*Primary Examiner*—Thomas Price
*Attorney, Agent, or Firm*—Fredrikson & Byron, PA

[57] ABSTRACT

An automatic aquatic food and water delivery device for supplying food and water to living creatures in an aquarium over an extended period of time including a reservoir positioned above the water line of an aquarium. A mixture of water and food is stored in the reservoir in a predetermined ratio. The reservoir has a sealable intake port for receiving food and water, and an outlet port through which the food and water mixture is delivered to an aquarium. An air supply is disposed within the reservoir and oriented generally towards the outlet port to prevent blockage of the outlet port. A delivery line is attached to the reservoir and an adjustable valve is positioned in the delivery line to control the flow rate of the food and water mixture into the aquarium.

10 Claims, 1 Drawing Sheet

1

AUTOMATIC AQUATIC FOOD AND WATER DELIVERY DEVICE

FIELD OF THE INVENTION

The present invention generally relates to automatic feeding devices and provides a device for automatically delivering an adjustable rate of food and replenishing water to fish and the like in an aquarium.

BACKGROUND OF THE INVENTION

Living creatures in aquariums require regular delivery of food and replacement of evaporated water. Hence, aquatic creatures must be fed and watered on a consistent schedule to keep the creatures alive. It is difficult to leave an aquarium unattended for any significant period of time, such as during vacations, without starving the creatures living therein or allowing the water level in the aquarium to drop unacceptably low.

SUMMARY OF THE INVENTION

The present invention provides a closed system for simultaneously delivering food to living creatures in an aquarium (e.g. fish) and replenishing water to the aquarium. Food and replenishing water are stored in a reservoir and delivered over a period of time. This permits one to feed the fish and replenish water in the aquarium without requiring anyone to manually add food and water to the aquarium.

The flow of food and water from the reservoir to the aquarium is regulatable. The rate at which the food and water are delivered may be regulated, or adjustably controlled, by means of an adjustable valve. The rate at which the food is delivered to the aquarium is regulated by both the rate at which the food and water mixture is delivered and by the relative proportions of food and water in the reservoir.

DESCRIPTION OF THE PREFERRED EMBODIMENTS

Figure 1:
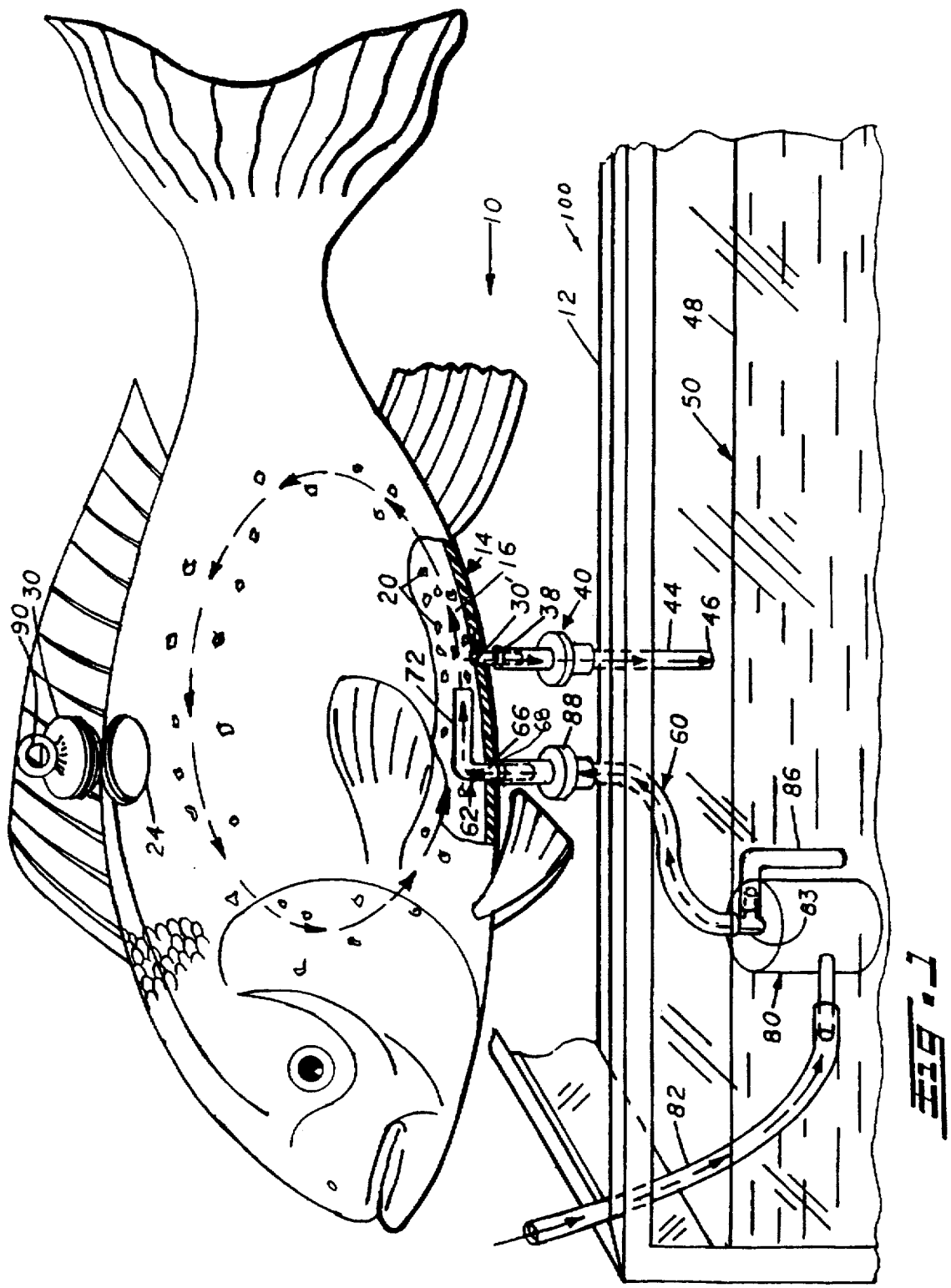
FIG. 1 is a perspective, partially broken away view of an aquarium and an automatic aquatic food and water delivery device in accordance with the invention.

FIG. 1 illustrates an automatic aquatic food and water delivery device 10 of the invention. As shown, the feeding device 10 is adapted for use with a conventional aquarium 12. The feeding device 10 has a reservoir 14 which is disposed above the level of water in the aquarium, and preferably above the level of the entire aquarium.

The reservoir 14 may be of any suitable size or shape. In the embodiment illustrated in FIG. 1, the reservoir is generally fish-shaped. A reservoir capable of holding about a quart of water and food mixture should work well.

The water 16 and food 20, which will tend to be a particulate fish food or the like, are placed in the reservoir through an intake port 24. This intake port should be adapted to allow one to readily add the water and the food to the reservoir and the port 24 is optimally positioned on an upper portion of the reservoir when the reservoir is positioned above the water of an aquarium 12, as illustrated. A removable plug 30 may threadingly engage the edges of the intake port 24, substantially sealing the reservoir.

A water and food outlet 30' for delivering water and food to the aquarium is optimally positioned on a lower portion of the reservoir. In the embodiment shown in FIG. 1, the outlet is positioned along the bottom of the reservoir when the reservoir is positioned above the aquarium 12.

A flexible water and food delivery tube or line 44 extends from the outlet 30' to a position spaced above the water level 48 of the water 50 in the aquarium tank, as shown. A manually controllable valve 40 may be provided in the delivery line 44 for manually controlling flow through the line. The upper end of the line 44 may be connected to the outlet 30' by means of an outlet pipe 38 depending downwardly from the water and food outlet 30'. Disposing the lower end of the line 44 above the water level 48 in the tank also permits a user to visually inspect the system and ensure that water and food are flowing into the aquarium.

Air is provided to the reservoir 14 through an air line 60. The air line may have a relatively stiff spout 62 having a generally inverted L-shape, as shown in FIG. 1. A generally vertical leg 66 of the air line 60 may extend through and be affixed to an air inlet port 68 which passes through a bottom portion of the reservoir. The air outlet 76 of the spout is provided at the end of a generally horizontal arm which is desirably oriented generally toward the water and food outlet 30'. This directs a flow of air across the upper side of the outlet 30', which serves to stir the water above the outlet. This turbulence helps prevent food particles from clogging the water and food outlet 30'.

The air line 60 is desirably connected to a standard air filter 80 positioned in the water of the aquarium. As is well known and understood in the art, such filters are provided with an air line 82 that delivers air to the filter under pressure so that air may be passed out through an outlet line 83 to aerate the water in the aquarium. In the present invention, air delivered to the outlet line 83 is directed into an aeration line 86 and to the air line 60. As explained above, the air line 60 will deliver this pressurized air to the lower leg 66 of the spout 62, and thence into the reservoir. The air line 60 may be provided with a manually controllable valve 88 to regulate the flow of the air into the reservoir, which is substantially closed due to the threaded seal between the plug 30 and the port 24.

As noted above, the reservoir is desirably positioned above the water level of an aquarium. If so desired, the reservoir can simply be suspended from an overhead support, such as a hook attached to the ceiling. A loop 90 or the like may be positioned adjacent to the top of the reservoir to facilitate suspension of the reservoir. In the illustrated embodiment, a loop 90 is provided on the plug 30.

In another embodiment of the invention, the invention comprises an automatic aquatic food and water delivery device 10 as outlined above used in conjunction with the aquarium to provide a complete waterer-feeder-aquarium system 100. This system will therefore have two parts, namely the food and water delivery device 10 detailed above and an aquarium 12. In this system, the reservoir 14 is positioned above the water line 48 of the aquarium, and is optimally positioned above the majority of the rest of the aquarium as well.

While the preferred embodiment of the invention has been described, it should be understood that various changes, adaptations and modifications may be made therein without departing from the spirit of the invention and the scope of the appended claims.

I claim:

1. An automatic aquatic food and water delivery device, comprising:

a reservoir having an intake port, an air inlet port, and a delivery port;

an air feed spout sealingly connected to the air inlet port for pressurizing said reservoir;

a means for delivering food and water through the delivery port to an aquarium tank at an adjustable rate; and a means for positioning said reservoir and said delivery means above a water level of an aquarium tank.

2. The automatic aquatic food and water delivery device of claim 1, wherein the means for delivering food and water further comprises;

an adjustable valve for controlling the flow rate through the delivery port; and at least one delivery line defining a conduit for delivering a food and water mixture into an aquarium tank, the delivery line being sealingly connected to the delivery port and to said adjustable valve.

3. The automatic aquatic food and water delivery device of claim 1, wherein said air feed spout is disposed within said reservoir and directed generally towards the delivery port; and said positional means comprises an eyelet attached to the top of said reservoir for suspending said reservoir and said delivery means above a water level of an aquarium tank.

4. The automatic aquatic food and water delivery device of claim 1, wherein said reservoir comprises a generally fish-shaped capsule.

5. An aquarium for automatically feeding and maintaining a water level in the aquarium for extended periods, comprising:

an aquarium having water therein; and an automatic aquatic food and water delivery device positioned above the water level of the aquarium, the delivery device comprising a reservoir having an intake port, an air inlet port, and a delivery port; a supply of water and food within the reservoir having a predetermined ratio of food and water; an air feed spout connected to the air inlet port as delivering pressurized air to the reservoir; a means for delivering food and water throughout delivery port to the aquarium at a regulatable rate.

6. An aquarium for automatically feeding and maintaining a water level in the aquarium for extended periods, comprising an aquarium having water therein and an automatic aquatic food and water delivery device positioned above the water level of the aquarium, the delivery device comprising:

a reservoir having an intake port, an air inlet port, and a delivery port;

an air feed spout sealingly connected to the air inlet port for pressurizing said reservoir;

a delivery line connected to the delivery port and extending into an aquarium tank; and a valve operatively connected to the delivery line, the valve being adapted to regulate flow of food and water through the delivery line to the aquarium tank.

7. The automatic aquatic food and water delivery device of claim 6, wherein said delivery line is sealingly connected to the delivery port and to said adjustable valve.

8. The automatic aquatic food and water delivery device of claim 6, wherein said air feed spout is disposed within said reservoir and directed generally towards the delivery port.

9. The automatic aquatic food and water delivery device of claim 6, wherein the delivery device further comprises an eyelet, the delivery device being supported above said water level by said eyelet.

10. The automatic aquatic food and water delivery device of claim 6, wherein said reservoir comprises a generally fish-shaped capsule.

* * * * *